United States Patent [19]
Gordon

[11] 3,752,629
[45] Aug. 14, 1973

[54] MOLD TRIM DEVICE
[75] Inventor: John Henry Gordon, Phoenixville, Pa.
[73] Assignee: Beloit Corporation, Beloit, Wis.
[22] Filed: Feb. 29, 1972
[21] Appl. No.: 230,442

[52] U.S. Cl............... 425/305 B, 264/98, 425/806, 425/DIG. 212
[51] Int. Cl............................................ B29d 23/03
[58] Field of Search................... 425/310, 311, 314, 425/806, DIG. 212, DIG. 208, 302 B, 305 B, 387 B; 264/94, 98, 99

[56] References Cited
UNITED STATES PATENTS
3,466,702  9/1969  Stenger........................... 264/98 X FOREIGN PATENTS OR APPLICATIONS
789,816  1/1958  Great Britain...................... 425/806
1,045,983  10/1966  Great Britain........................ 264/99

Primary Examiner—H. A. Kilby, Jr.
Attorney—Roberts B. Larson, Marvin Petry et al.

[57] ABSTRACT

A parison cutting device mounted on a mold. A knife blade mounted on one mold half extends out beyond the face of that mold half and reacts resiliently against a surface on the other mold half to cut by a shearing action a parison extending into the mold between the knife blade and the reaction surface as the mold halves close against each other to form the single mold cavity. The blade angle may be selected to provide either a sealed or an opened parison.

6 Claims, 10 Drawing Figures

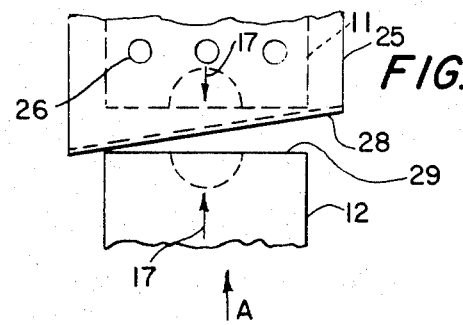
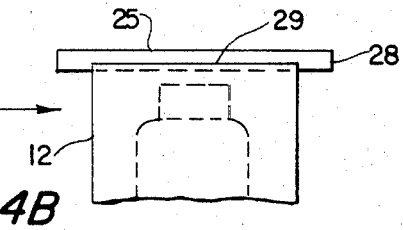
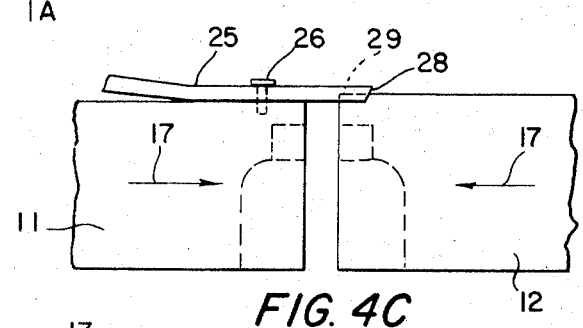
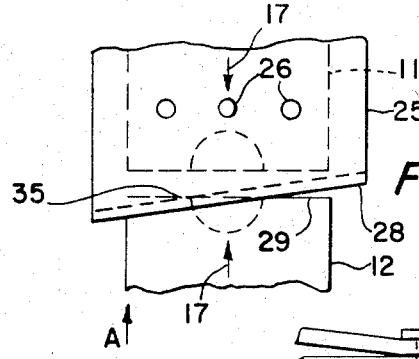
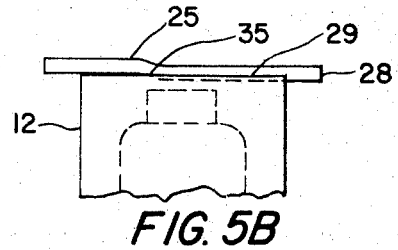
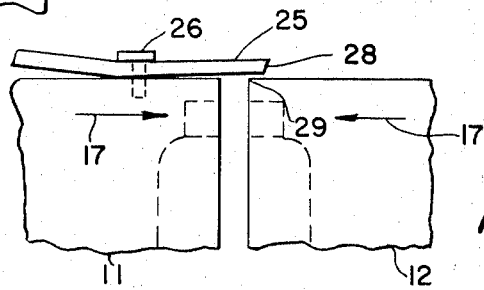
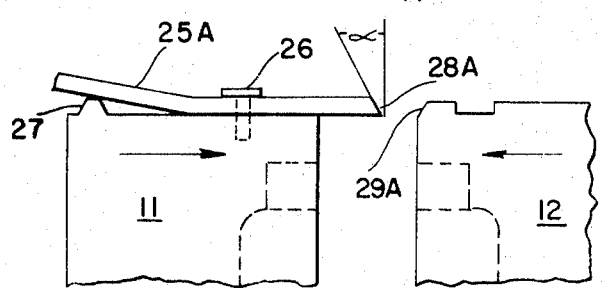

MOLD TRIM DEVICE

BACKGROUND OF THE INVENTION

This invention relates to molding and in particular it relates to blow molding of articles from a parison.

One well known blow molding technique uses, as a starting material, a hollow elongated tube known as a parison. The parison is placed between opposing faces of first and second mold halves, cavities being formed into the said opposing faces such that when the mold is closed, the cavities form a single cavity having the shape of the article being molded. Either one or both of the mold halves will be movable to close the mold halves against each other. As the mold halves close against each other, they clamp a parison in the mold, closing off the interior of the mold except for either a passage for introducing a fluid under pressure, normally compressed air, into the interior of the parison and/or a passage for applying a vacuum on the outside of the parison thereby creating a pressure across the parison forcing it outwardly to conform to the shape of the said cavity, thereby forming the finished article.

The parisons are normally formed by an extrusion process, but can be made in other ways, i.e., injection molding. The parisons may be delivered immediately upon being formed into the space between open, opposing mold halves or alternatively the parisons may be cooled to be stored to be heated and used at a later time. For convenience, this application will refer hereinafter only to the extrusion process for making parisons.

In the so-called hot parison process (the process wherein the extruded parison is delivered directly into the mold), a means must be provided for cutting off the desired length of extrusion for each cycle of operation of the mold.

In the so-called cold parison process (wherein the parisons are delivered from the extruder into storage for reheating and forming at a later time), cutting at the extruder is not quite as critical since it is not necessary to provide interaction between the extruder and the mold at a given point in time. Nonetheless, when subsequently using these stored cold parisons in a blow molding apparatus, unless the cut parisons conform exactly to the size of the mold, it may be desirable to cut off waste portions of the parison during the actual molding operation.

Heretofore, it has been known to provide, especially for use in the hot parison process, a cutting device separate from either the mold or the extruder for cutting off selected lengths of extruded parison. This arrangement has the disadvantage that it must be somewhat complex in order to synchronize the movement of the cutting device with the movement of the molding apparatus.

In an attempt to overcome the disadvantages described above, it has been attempted to mount a cutting device directly on the mold parts themselves, thereby assuring movement of the cutting elements with the mold parts and thus eliminating the problem of synchronizing the movement of these parts. However, until now, such cutting devices, which have been mounted as part of the mold halves, have performed the cutting action in a most unsatisfactory manner. For example, on too many occasions they have resulted in an incomplete cut. This is a very costly disadvantage. Keeping in mind that the extrusion apparatus should operate continuously or nearly so, this means that a man may have to be stationed at the mold apparatus for the sole purpose of reaching in by hand to complete the cut across the extruded parison when the cut is not completely formed by the cutting device.

Thus, in order to improve the efficiency of operation of a blow molding apparatus, there exists a need for a new and improved parison cutting device.

SUMMARY OF THE INVENTION

Thus, it is a purpose of this invention to provide a new and improved parison cutting device for use with a blow molding apparatus.

This purpose of the present invention is achieved by providing a cutting arrangement including a knife blade mounted on one of the mold halves and urged by resilient means against the mold half on which it is mounted. The other mold half includes a reaction surface against which the cutting edge of the knife blade acts in a resilient manner as the two mold halves are closed against each other. The parison is thus delivered into the mold through the space between the knife blade and the reaction surface such that the parison is cut by the same as the mold halves are closed against each other.

The knife blade, viewed from above, is angled rearwardly (relative to the direction of travel of that mold half as it closes), whereas the reaction surface on the other mold half extends directly across the front face of that mold half. As a result thereof, when the mold halves are closed, a leading portion of the knife blade first engages the reaction surface at a point, and this point travels rearwardly along the inclined cutting edge of the knife blade (and concurrently, of course, transversely across the reaction surface) as the mold halves close. As a result, the parison is cleanly sheared by the engaging knife blade and reaction surface. The terms "front," "rear," the direction of movement, etc., refer only to each mold half with respect to the other mold half. It is to be understood that the whole mold may itself be movable in other directions on a mold carriage in a manner known per se.

In a preferred arrangement of the present invention, the resilient means of the knife blade includes the construction wherein the knife blade itself is constructed of a hard, stiff resilient material such as spring steel. The blade may be mounted on top of the mold (assuming that the parison is delivered into the mold from above). This spring steel knife blade may be mounted for rocking movement about a rocking axis located near and parallel to the front face of the mold half on which it is mounted. A suitable, preferably adjustably means may be provided rearward of this rocking axis, urging the rear portion of the blade upwardly, and thus urging the front cutting portion of the blade downwardly toward the mold half. This downward force will be exerted on the reaction surface when the mold halves are closed against each other.

It has been found that the inclination of the cutting edge of the knife blade, taken in a plane parallel to the inside face of the mold, may be selected to either seal the parison closed or leave the parison open as it cuts the parison.

Although it is normally necessary to provide such a parison cutting device on the side of the mold from which the parison is delivered, it may also be desirable to place such a knife on the opposite side, for example the bottom of the mold to cut off excess parison length.

Thus, it is an object of this invention to provide a new and improved parison cutting device.

It is another object of this invention to provide a molding apparatus having mounted thereon a new and improved parison cutting device.

It is another object of this invention to provide a parison cutting device for use on a blow molding apparatus of the type adapted to blow a parison into a finished article, wherein the cutting device includes an edge resiliently urged against a reaction surface to cut a parison cleanly and reliably.

Other objects and advantages of the present invention will become apparent from the detailed description to follow, along with the accompanying drawings.

BRIEF SUMMARY OF THE DRAWINGS

There follows a detailed description of preferred embodiments of the present invention to be read together with the accompanying drawings which are provided solely for purposes of illustration.

FIG. 4A is a plan view similar to FIG. 3 showing parts of the present invention during a stage of operation.

FIG. 4B shows the elements of FIG. 4A taken in the direction of the arrow A.

FIG. 4C is a side elevation taken in the direction of the arrow B of FIG. 4B.

FIG. 5A is a plan view similar to FIG. 4A but showing the parts of the mold closer together.

FIG. 5B is an elevation view taken in the direction of the arrow A in FIG. 5A.

FIG. 5C is a side elevation view taken in the direction of the arrow B of FIG. 5B.

FIG. 6 is an enlarged side elevational view similar to a portion of FIG. 1 but showing a modification of the present invention.

DETAILED DESCRIPTION OF THE PREFERRED EMBODIMENTS

Figure 1:
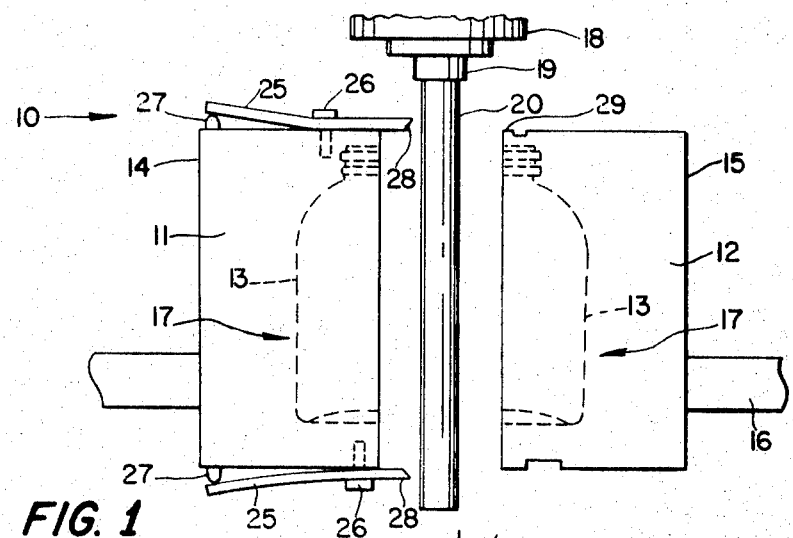
FIG. 1 is a side elevation view of a mold apparatus with the mold halves separated from each other to receive a hot extruded parison and including a cutting device constructed in accordance with the present invention.

Referring now to the drawings, like elements are represented by like numerals throughout the several views.

Figure 2:
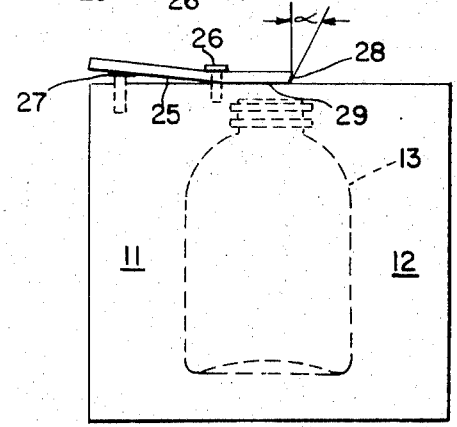
FIG. 2 is an elevation view of the mold halves of FIG. 1 in the closed position.
Figure 3:
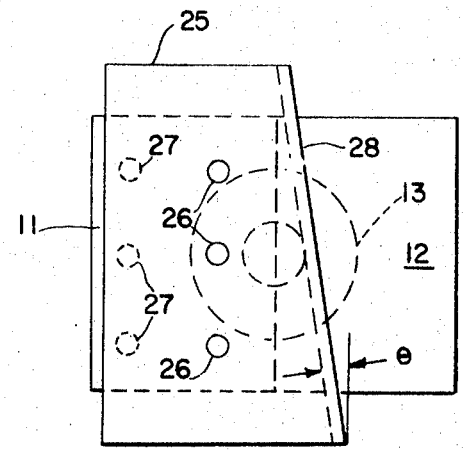
FIG. 3 is a plan view of FIG. 2.

Referring to FIGS. 1 through 3, there is provided a blow mold 10 comprising a first mold half 11 and a second mold half 12. The opposing faces of these mold halves, which are in planes perpendicular to the plane of the drawing, have formed therein recesses 13 such that when the mold halves are brought together as in FIGS. 2 and 3, the recesses form a cavity having the shape of the article to be formed. In FIG. 1, the mold halves include specially machined upper portions 14 and 15 in which are located portions of the cavity 13 having threaded parts. For simplicity, these details are eliminated in the remaining views.

The mold halves 11 and 12 are mounted on a frame which is known per se and is shown only schematically as elements 16 in FIG. 1, for movement towards each other in the direction of the arrows 17.

The molding apparatus of FIG. 1 can of course be used with either a hot, freshly extruded parison or a parison which was previously extruded, cooled and then reheated and placed into the mold. In FIG. 1, there is shown schematically an extruder 18 having a nozzle 19 for extruding a hollow parison 20.

In accordance with a main feature of the present invention, an arrangement is provided for cutting the parison 20 as the mold halves 11 and 12 close against each other. This arrangement includes a knife blade 25 which is a generally flat piece of stiff resilient material such as spring steel. The blade is held by a number of screws 26 (see FIG. 3) arranged along a line parallel to the face of the mold. The screws are sufficiently tight to prevent any substantial vertical movement of the knife blade 25 in the vicinity of the screws 26. However, they are not as tight as possible since it is desired to permit a slight rocking of the knife blade 25 about an axis passing through the screws 26. The front part of knife blade 25 terminates in a rearwardly inclined edge 28 (see FIG. 3). The rear part of the blade 25 on the opposite side of the screws 26 is urged upwardly by the heads of screws 27 which are threadedly engaged in the mold halves 11, and the upper ends of which abut the blade 25. By thus urging the rear part of the blade upwardly, the front part of the blade including the edge 28 is urged downwardly towards the mold half 11. The other mold half 12 includes a surface 29 extending directly across the upper inside corner of the said other mold half. As the two mold halves close against each other, the downward force exerted on the front edge 28 of the blade 25 urges the edge 28 against the reaction surface 29.

The operation of the cutting device will now be explained with reference to FIGS. 4 and 5. First, FIGS. 4A, 4B and 4C show top, end and side views of the cutting portions as the edge 28 and the reaction surface 29 first contact each other. Note in FIG. 4B that the bottom of edge 28 is below the upper inside corner of mold 12 which forms the reaction surface 29. Because of the rearward inclination of the cutting edge 28 (as shown in FIG. 4A, the edge 29 first contacts the edge 28 at a point).

Following the engagement of elements 28 and 29 as shown in FIGS. 4A through 4C, and owing to the rearward inclination of the edge 28, the point of engagement sweeps across the edge 29 as the mold halves 11 and 12 move towards each other. An intermediate point is shown in FIGS. 5A through 5C. Here, the point of contact is shown approximately at 35. Note in FIG. 5B that the lowered surface of the righthand side of blade 25 is still below the level of edge 29 whereas the portion of blade 25 to the left of point 35 is above the line 29. Note in FIG. 5A that this said left-hand part of the blade 25 has passed above and beyond the edge 29.

As is evident from the above, the cutting edge 28 sweeps across the reaction surface edge 29 with a shearing motion which cuts the parison most efficiently. To achieve this efficient shearing cutting action, it is important that the front of blade 25 in the vicinity of the edge 28 be urged toward the reaction surface 29 during the entire time that the blade 28 sweeps across this reaction surface 29. This goal is achieved by means of the resilient characteristics of the blade 25. The constructional features providing these resilient characteristics have been discussed above.

It is a feature of the present invention that the characteristics of the cutting action can be determined by selecting the design of the cutting edge 28. In FIGS. 1 through 5 there has been described a knife blade in which the cutting edge 28 has an upwardly and forwardly inclined angle of inclination α. See FIG. 2. It has been found that such a forwardly and upwardly inclined angle α will not only cut the parison but will weld it closed at the cut. In contrast thereto, it may be desirable to leave the parison open at the cut. FIG. 6 shows a modified knife blade 25A which will cut the parison in such a manner as to leave it open, that is unwelded. For this purpose, the knife blade 25A is provided with an upwardly and rearwardly inclined cutting edge 28A, as indicated by the angle α. Since the point of the edge 28A is lowermost in FIG. 6, the reaction surface 29A must be provided as a bevel rather than a sharp corner so that the sharp point of edge 28A can ride up the bevel 29A as the edge 28A sweeps across the surface 29A. In all other respects, the elements of FIG. 6 are similar to the embodiment of FIGS. 1 through 5.

The characteristics of the cutting action may be further controlled not only by varying the magnitude and direction of the angle α but also by varying the rearwardly inclined angle θ. See FIG. 3.

Although the invention has been described in detail with respect to preferred embodiments thereof, it will be apparent that the invention is capable of numerous variations and modifications apparent to those skilled in the art without departing from the spirit and scope of the invention. I claim:

1. For a mold of the type comprising first and second mold halves mounted for relative movement toward and away from each other for molding an elongated parison into the shape of a cavity formed in the opposing faces of the closed mold halves; a cutting means for cutting an elongated parison extending from outside the area between the opposing faces of the mold halves into said area, said cutting means comprising, a generally flat knife blade mounted on the outside of the first mold half, and projecting out beyond the said face of that mold half toward the second mold half, said blade extending in a plane generally transverse to the direction of elongation of the parison, means resiliently urging the cutting edge of the blade toward the first mold half, a reaction surface on the second mold half positioned to be engaged by the knife blade as the mold halves close against each other, whereby as the mold halves close against each other, a parison extending into the mold between the knife blade and the reaction surface is cut as the knife blade resiliently engages the reaction surface under the influence of said resilient means.

2. The invention of claim 1, wherein the cutting edge of the blade, viewed in the direction from which the parison enters the area between the mold halves, forms an angle with the plane of the said face of the first mold half, and wherein the reaction surface extends across the second mold half generally parallel to the plane of the said face of the second mold half, whereby as the mold halves close onto each other, a leading part of the knife blade edge first engages the reaction surface, after which successive trailing parts of the knife blade edge engage the reaction surface in a shearing action.

3. The invention of claim 2, said resilient means comprising the construction wherein: the knife blade is of a stiff hard resilient material, and including means for securing the blade to the outside of the first mold half to rock about a rocking axis located near and generally parallel to the said face of the first mold half, and means for urging the rear part of the said knife blade on the side of the rocking axis away from the said face away from the mold, and hence causing the front part of the knife blade on the side of the rocking axis closest to the said face of the first mold half to be urged toward the first mold half.

4. The invention of claim 3, wherein said means for urging is adjustable to vary the force acting on the said rear part of the knife blade to thus vary the resilient force of the front part of the knife blade toward the first mold half.

5. The invention of claim 2, wherein the cutting edge of the blade, taken in a plane perpendicular to the plane of the first mold half face, is inclined rearwardly toward the inside of the mold.

6. The invention of Claim 2, wherein the cutting edge of the blade, taken in a plane generally perpendicular to the plane of the first mold half face is inclined rearwardly away from the inside of the mold.

* * * * *